Feb. 18, 1969 W. R. LESSIG III, ETAL 3,428,328
WHEEL HEIGHT ADJUSTMENT FOR LAWN MOWER
Filed April 4, 1967
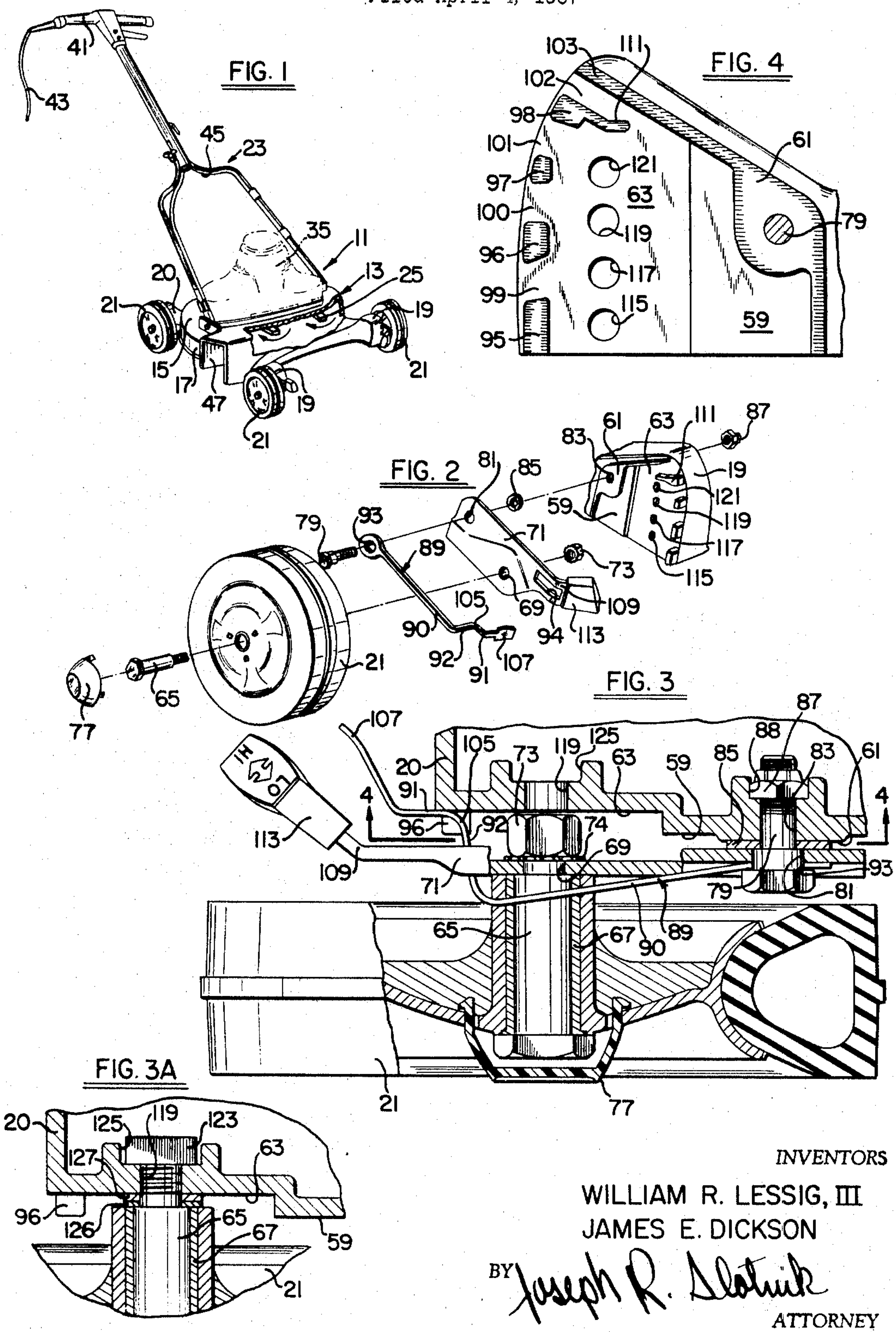
INVENTORS
WILLIAM R. LESSIG, III
JAMES E. DICKSON
BY Joseph R. Slotnik
ATTORNEY

United States Patent Office 3,428,328 Patented Feb. 18, 1969

3,428,328

WHEEL HEIGHT ADJUSTMENT FOR LAWN MOWER

William R. Lessig III, Baltimore, and James E. Dickson, Towson, Md., assignors to The Black and Decker Manufacturing Company, Towson, Md., a corporation of Maryland

Filed Apr. 4, 1967, Ser. No. 628,438
U.S. Cl. 280—43.17 13 Claims
Int. Cl. B62d *21/14*

ABSTRACT OF THE DISCLOSURE

A lawn mower of the type having a deck housing supported upon the ground by a plurality of wheels and provided with an upstanding handle for control and manipulation thereof. One or more rotary blades are supported by the housing for rotation in a plane generally parallel to the ground and are adapted to be rotatably driven by a motor supported atop the housing. The wheels are adjustably secured to the housing so that by selectively positioning the wheels vertically relative to the housing, the cutting height of the blade or blades is varied.

This invention relates generally to lawn mowers, and particularly to an improved cutting height adjustment construction therefor.

*Brief summary of the invention*

The present invention relates to an improved cutting height adjustment construction for rotary lawn mowers of the type having cutting blade means supported by a mower housing and the latter supported by ground engaging wheels, wherein the wheels are individually vertically adjustable relative to the housing in a simple, positive and uniform manner. In this invention, the housing and the wheel construction are cooperatively formed to accommodate a basic as well as a more sophisticated adjustment construction and require a minimum of part change or reconstruction to convert from one construction to the other and, in both constructions, the wheels do not tend to become dislodged or unseated from their adjusted positions as a result of forces arising during normal mower use.

Important objects of the present invention, therefore, are to provide an improved cutting height adjustment construction for lawn mowers of the type having a housing, ground engaging wheels supporting said housing and mowing blade means supported by said housing, and wherein said cutting height adjustment is effected by vertical adjustment of said wheels relative to said housing, which construction is readily convertable from one relatively simple and inexpensive form to another more sophisticated one, and which, in either form, facilitates positive and accurate wheel adjustment with minimal operator effort.

Another important object of the present invention is to provide an improved adjustment construction of the above character which retains the wheels in preselected adjusted positions relative to the housing and resists inadvertent or unintended vertical wheel movement as a result of the forces normally arising during mower operation.

Another important object of the present invention is to provide an improved adjustment construction of the above character which employs a minimum of separate parts and wherein adjustment is uniform for each wheel.

Still another important object of the present invention is to provide an improved adjustment construction of the above character which requires a minimum of part change and/or replacement to effect conversion from one form to the other.

Still other important objects of the present invention are to provide an improved adjustment construction of the above character in which conversion from one form to another is effected safely, with easy and with a minimum of part change and/or replacement, and in which both forms are safe and easy to operate.

Further objects include the provision of an improved adjustment construction of the above character which is neat and aesthetically pleasing in appearance, relatively inexpensive to manufacture, rugged and light-weight in construction and reliable in use.

Other objects and advantages of the present invention will become more apparent from a consideration of the detailed description to follow taken in conjunction with the appended drawings.

*Brief description of the drawings*

FIG. 1 is a perspective view illustrating a lawn mower embodying the present invention;

FIG. 2 is an exploded perspective view, taken at one wheel connection, illustrating the sophisticated form of wheel adjustment mechanism;

FIG. 3 is an enlarged, horizontal sectional view, taken at another wheel connection, illustrating the sophisticated wheel adjustment mechanism;

FIG. 3A is a fragmentary view similar to FIG. 3, but illustrating the simplified wheel adjustment mechanism; and FIG. 4 is a sectional view of FIG. 3, taken along the line 4—4 thereof.

*Broad statement of the invention*

Broadly described, the present invention relates to a lawn mower of the type having a housing, ground engaging wheels supporting said housing relative to the ground and mowing blade means supported by said housing; that improvement in said mower which includes means adjustably interconnecting each said wheel with said housing for relative vertical movement there-between, said interconnecting means comprising arm means detachably supported upon said housing adjacent each said wheel and adjustable relative to said housing, each said arm means including an interconnected rigid arm and flexible lever conjointly pivoted adjacent one end to said housing, fastening means associated with each said wheel for securing the latter to respective ones of said rigid arms, each said flexible lever having a free portion movable laterally relative to its respective arm, spaced lugs formed on the outer, lateral side face of said housing adjacent each said arm means and defining recesses therebetween, each said flexible lever including a bight portion adapted to be received in said recesses to secure said arms in selected positions and said wheels in selected vertical positions relative to said housing, each said flexible lever being manually flexible laterally to withdraw said bight portions from between said lugs, said fastening means also being cooperable with vertically spaced means on said housing for adjustably securing said wheels directly to said housing when said arm means are omitted.

In another aspect, the present invention relates to a lawn mower of the type having a housing, ground engaging wheels supporting said housing relative to the ground and mowing blade means supported by said housing; that improvement in said mower which includes means adjustably interconnecting each said wheel with said housing for relative vertical movement therebetween, said interconnecting means comprising arm means detachably supported upon said housing adjacent each said wheel and adjustable relative to said housing, each said arm means including an interconnected rigid arm and flexible lever conjointly pivoted adjacent one end to said housing, each said flexible lever having a warped portion adjacent said pivoted area to take up slack between each said flexible lever and its associated rigid arm, fastening means associated with each said wheel for securing the latter to respective ones of said rigid arms, each said flexible lever having a free portion movable laterally relative to its respective arm, spaced lugs formed on the outer lateral side face of said housing adjacent each said arm means and defining recesses therebetween, each said flexible lever including a portion adapted to be received in said recesses to secure said arms in selected positions and said wheels in selected vertical positions relative to said housing, each said flexible lever being manually flexible laterally to withdraw said lever portions from between said lugs, said fastening means also being cooperable with vertically spaced means on said housing for adjustably securing said wheels directly to said housing when said arm means are omitted.

In still another aspect, the present invention relates to a lawn mower of the type having a housing, ground engaging wheels supporting said housing relative to the ground and mowing blade means supported by said housing; that improvement in said mower which includes means adjustably interconnecting each said wheel with said housing for relative vertical movement therebetween, said interconnecting means each comprising a rigid arm and a laterally flexible lever conjointly pivotally secured to said housing by bolt means, each of said rigid arms adapted to have a respective one of said wheels secured thereto by fastening means, each said flexible lever including first and second generally longitudinal portions disposed on opposite sides of a respective one of the rigid arms and interconnected by a transverse portion extending through an opening in said rigid arm, said first longitudinal portion receiving said bolt means adjacent one end thereof remote from said second longitudinal portion, said second longitudinal portion and said transverse portion forming a detent bight which is adapted to normally engage selected spaced recess means on said housing to adjust said wheels vertically relative thereto, said bight and recesses together forming detent means, said second longitudinal portion of each said flexible lever being spaced laterally of its associated rigid arm and movable toward the latter to release said bight from said recess means, said fastening means also being cooperable with vertically spaced means on said housing for adjustably securing said wheels directly to said housing when said arm means are omitted.

*Detailed description*

Referring now more specifically to the drawings, a rotary type, electric lawn mower embodying the present invention is illustrated generally at 11 in FIG. 1. It is to be understood that the cutting height adjustment construction of the present invention has application to other types of wheeled mowers, both gasoline and electric powered, as well as to other types of mobile lawn and garden mowing or cutting tools, wherein it is desirable to adjust the blade cutting height.

With this in mind, the mower 11 is seen to include a housing 13 having a top 15 and a peripheral skirt 17. The housing 13 is provided with front and rear pairs of feet 19, 20 which preferably are integral with the housing 13 and extend outwardly of the skirt 17. The feet 19, 20 have ground engaging wheels 21 supported relative thereto thereby supporting the housing 13 relative to the ground and permitting it to move therealong in the usual manner. An upstanding handle 23 is secured upon the housing 13 for control and manipulation of the mower 11 as is conventional.

The mower is provided with one or more rotary type blades 25 disposed within the housing skirt 17 and beneath the housing top 15 and which are disposed for rotation about generally vertical axes. An electric drive motor (not shown) is supported upon the housing top 15 and covered by a shroud 35 and is interconnected by a transmission (not shown) with the blades 25. The motor is energized by connecting the same to an electrical source through a line cord 43 and a motor cable 45 both of which are connected to an on-off switch (not shown) conveniently carried at a hand grip 41, the latter being fixed to the handle 23. Thus, when the line cord 43 is plugged into an electrical source and the switch (not shown) turned on, the motor (not shown) is energized and the blades 25 rotated. Thereafter, as the mower is wheeled over the ground, the rotating blades 25 cut the grass and the cuttings are discharged through a discharge opening 47 in the housing skirt 17. If desired, a grass catching bag assembly (not shown) may be mounted over the opening 47 to catch the grass cuttings.

The details of the handle 23, the deck housing 13, and the motor mount and transmission form no part of the present invention and for this reason are not illustrated nor described further here. However, for a better understanding thereof, reference may be made to copending applications Ser. Nos. 623,995, 628,363 and 636,343, filed Mar. 17, 1967, Apr. 4, 1967 and May 5, 1967 and all of which are owned by the assignee of the present invention.

It will be appreciated that the cutting height of the blades 25 is determined by the elevation of the housing 13 relative to the ground while the latter is a function of the relative vertical position between the housing 13 and the ground engaging wheels 21. It is desirable to provide for blade cutting height adjustment and, to this end, provision is made for relative vertical adjustment between the ground engaging wheels 21 and the housing 13. Thus, the front and rear feet 19, 20 together with the wheels 21 and their associated structure are constructed and interconnected in a novel manner, according to the present invention, calculated to permit safe, rapid and accurate vertical adjustment between the wheels 21 and the housing 13, and to provide a positive interconnection therebetween which will not become disengaged as a result of the forces normally arising during use. In addition, the basic foot and wheel construction of the present invention is such to accommodate a relatively simple and inexpensive adjustment arrangement or a more sophisticated one and in converting from one to the other, a minimum amount of part change and/or replacement is required. The construction of the feet 19, 20 and that of the structure associated with each wheel 21 is substantially the same with the exception that certain ones are made to the opposite hand from others for reasons that will be appreciated by those skilled in the art. Of course, like numerals refer to like parts in all the figures.

As shown in FIGS. 2–4, each of the feet 19, 21 has an outer generally flat surface 59 provided with a boss 61 thereon and a depressed surface 63 adjacent thereto. Each wheel 21 is rotatably supported by a sleeve bearing 67 on an axle bolt 65 which, in the sophisticated form of wheel adjustment shown in FIGS. 2–4, extends through an opening 69 in an adjusting arm 71 and is held in place thereon by a nut 73 and a lock washer 74. For a finished appearance, a hub cap 77 is detachably secured to each wheel 21 by snapping it in place over the outer end of the axle bolt 65.

In this form, each adjusting arm 71 is pivotally secured to a respective one of the bosses 61 by a shoulder bolt 79 extending through an opening 81 in one end of the arm 71 and through an opening 83 in the boss 61. A metal washer 85 is positioned between the arm 71 and the boss 61 and the bolt 79 is held in place by a nut 87 trapped in a socket 88. It will be seen that by pivoting each of the arms 71 upwardly about the axis of the bolts 79, the wheels 21 are correspondingly moved upwardly relative to the housing 13. Since the wheels 21 remain in contact with the ground, upward movement of the arms 71 lowers the position of housing 13 and the blades 25. Conversely, when the arms are pivoted downwardly, the wheels 21 are lowered and the housing 13 and the blades 25 are raised relative to the ground.

To releasably hold the arms 71 in selected, adjusted positions, cooperable detent means is provided on each arm 71 and its associated housing foot 19, 20. Thus, as shown in FIG. 3, a detent locking lever 89 is adjacent to the arm 71 and has an opening 93 at one end pivotally receiving the shoulder bolt 79. (see also FIG. 3.) The locking lever 89 has first and second generally longitudinal portions 90, 91 disposed on opposite sides of the arm 71 and interconnected by a generally transverse portion 92 which extends through an aperture 94 in the arm 71. The detent locking lever 89 is relatively thin in cross-section and is constructed from a material such as, for example, spring steel so as to be flexible in a lateral direction. The longitudinal portion 90 of the locking lever 89 is warped or bent at the area of the opening 93, as shown in FIG. 3, so that the longitudinal locking lever portion 90 diverges away from the arm 71. The longitudinal portion 91 also is spaced laterally of the arm 71 so that the locking lever 89 is movable laterally of the arm 71 by flexing the former about the shoulder bolt 79. The detent locking lever 89 and the arm 71, however, pivot conjointly about the shoulder bolt by virtue of the interconnection of the locking lever transverse portion 92 and the arm aperture 94.

As described above, he locking lever longitudinal portion 90 is bent or warped at the area of the opening 93. This construction takes up any slack in the shoulder bolt 79 when the latter is tightened and provides a firm connection without any tendency for the arm 71 and the locking lever 89 to bind.

The depressed surface 63 on each of the feet 19, 20 is provided with a plurality of vertically spaced lugs 95, 96, 97, 98 and a ledge 103 which define a plurality of detent recesses 99, 100, 101, 102 therebetween. Each locking lever 89 is provided with a detent bight 105 at the bend between the longitudinal portion 91 and the transverse portion 92, which bight 105 is adapted to cooperatively engage in the recesses 99, 100, 101, 102 to selectively hold the arms 71 and therefore the wheels 21 in vertically spaced positions relative to the housing 13. The locking levers 89 resist bending on flexing in a vertical direction, since it is the bights 105 which engage the lugs 95, 96, 97, 98, and provide strong support for the mower upon the wheels 21. Each locking lever 89 has an outer end 107 angled away from the adjacent wheel 21 and which generally parallels an outer end 109 of the adjacent arm 71. Thus, by grasping these outer ends 107, 109 and squeezing them togeher, the locking lever 89 is flexed toward the arm 71 and the detent bight 105 lifted clear of the recesses 99, 100, 101 and 102. The arms 71 can then be pivoted and the wheels 21 adjusted to raise or lower the housing 13 and correspondingly the blades 25 relative to the ground. The bights 105 allow the levers 89 to be made sufficiently flexible to accommodate easy wheel adjustment without detracting from their supporting function.

Manifestly, when the arms 71 are pivoted upwardly and the wheels 21 raised, the housing 13 and the blades 25 are lowered. Conversely, when the arms 71 are pivoted downwardly, the blades 25 are raised relative to the ground. Each lug 98 preferably has a rearwardly extending portion 111 positioned to engage the nut 73 when the detent bight 105 is located opposite the recess 102 to prevent further upward movement of the arms 71. If desired, the outer end 109 on the arms 71 may each have a plastic cap 113 thereon and which is marked to advise the user which way to pivot the arms 71 to raise or lower the blade or cutting height as desired.

This sophisticated version of the adjustment construction described above and illustrated in FIGS. 2–4 is highly advantageous in that it permits rapid and accurate adjustment of the wheels 21 relative to the housing 13 and therefore the blades 25 relative to the ground. Furthermore, the locking lever 89, and particularly its detent bight 105 does not tend to become dislodged from the recesses 99, 100, 101, 102 during use since the forces normally acting thereon during mower use act in a generally vertical direction. Also, the detent lugs 95–98 and the ledge 103 are integral with the feet 19, 20 and only the arms 71, the locking levers 89 and the shoulder bolts 79 and nuts 87 and washers 85 are separate parts and of these, all are uniform at each wheel, with the exception that two of the levers 89 and arms 71 are made to the opposite hand to, or are the reverse of the other two levers 89 and arms 71.

As set forth above, the present invention contemplates a basic adjustment construction which may readily be replaced by or substituted for the sophisticated version described above. This, as seen in FIGS. 2 and 4, each foot 19, 20 is provided with a plurality of vertically spaced openings 115, 117, 119, 121 extending therethrough at the area of the depressed surface 63. The axle bolts 65 are adapted, when the arms 71 together with the locking levers 89 are removed, to extend through a flat washer 125 and a lock washer 127, through selected ones of the openings 115, 117, 119, 121 and are secured in place by nuts 123 trapped in a slot 125 (see FIG. 3A). Thus, for example, in an economy model mower, the arms 71 and locking levers 89 might be omitted while they are included in a deluxe model. In either case, the same safe and positive wheel adjustment is carried out since the adjustment construction is located outside the housing skirt 17 so that the operator is fully protected from the blades 25 when working thereon. Furthermore, and perhaps most importantly, one standard housing 13 is employed for both versions and convension from one to the other is made with a minimum of part change.

By the foregoing, there has been disclosed an improved cutting height adjustment construction for lawn mowers and the like calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. In a lawn mower of the type having a housing, ground engaging wheels supporting said housing relative to the ground and mowing blade means supported by said housing; that improvement in said mower which includes means adjustably interconnecting each said wheel with said housing for relative vertical movement therebetween, said interconnecting means comprising arm means detachably supported upon said housing adjacent each said wheel and adjustable relative to said housing, each said arm means including an interconnected rigid arm and flexible lever conjointly pivoted adjacent one end to said housing, fastening means associated with each said wheel for securing the latter to respective ones of said rigid arms, each said flexible lever having a free portion movable laterally relative to its respective arm, spaced lugs formed on the outer, lateral side face of said housing adjacent each said arm means and defining recesses therebetween, each said flexible lever including a bight portion adapted to be received in said recesses to secure said arms in selected positions and said wheels in selected vertical positions relative to said housing, each said flexible lever being manually flexible laterally to withdraw said bight portions from between said lugs, said fastening means also being cooperable with vertically spaced means on said housing for adjustably securing said wheels directly to said housing when said arm means are omitted.

2. A construction as defined in claim 1 wherein said housing includes a top and a generally peripheral dependent skirt, said mowing blade means being disposed within said skirt, said housing including a plurality of feet outwardly of said skirt and having said lugs and said vertically spaced means forward thereon.

3. A construction as defined in claim 1 wherein each said wheel is rotatably supported upon an axle bolt, each said axle bolt being adapted to be secured to a respective one of said arm means, said housing having a plurality of verticaly spaced openings adjacent each said wheel and adapted to receive a respective one of said axle bolts when said arm means are omitted.

4. A construction as defined in claim 1 wherein each said fastening means includes an axle bolt rotatably supporting a respective one of said wheels and adapted to be detachably secured to a respective one of said rigid arms and directly to said housing when said rigid arms are detached from said housing.

5. A construction as defined in claim 4 wherein said flexible lever is warped at the area of said bolt means, whereby to take up slack between said flexible lever, said rigid arm and said housing upon tightening said bolt means.

6. A construction as defined in claim 1 wherein said lugs are integral with said housing and are uniform at each wheel.

7. A construction as defined in claim 5 wherein said bolt means, when tightened, biases said flexible lever free portion toward said recess means.

8. In a lawn mower of the type having a housing, ground engaging wheels supporting said housing relative to the ground and mowing blade means supported by said housing; that improvement in said mower which includes means adjustably interconnecting each said wheel with said housing for relative vertical movement therebetween, said interconnecting means each comprising a rigid arm and a laterally flexible lever conjointly pivotally secured to said housing by bolt means, each of said rigid arms adapted to have a respective one of said wheels secured thereto by fastening means, each said flexible lever including first and second generally longitudinal portions disposed on opposite sides of a respective one of the rigid arms and interconnected by a transverse portion extending through an opening in said rigid arm, said first longitudinal portion receiving said bolt means adjacent one end thereof remote from said second longitudinal portion, said second longitudinal portion and said transverse portion forming a detent bight which is adapted to normally engage selected spaced recess means on said housing to adjust said wheels vertically relative thereto, said bight and recesses together forming detent means, said second longitudinal portion of each said flexible lever being spaced laterally of its associated rigid arm and movable toward the latter to release said bight from said recess means, said fastening means also being cooperable with vertically spaced means on said housing for adjustably securing said wheels directly to said housing when said arm means are omitted.

9. A construction as defined in claim 8 wherein said flexible lever is warped at the area of said bolt means so that when tightened, said bolt means biases said detent bight toward said recess means.

10. A construction as defined in claim 8 wherein said flexible lever first portion diverges away from said rigid arm from said one end toward said transverse portion, said flexible lever one end being warped so that when said bolt means is tightened, one end is flattened and said first portion is biased toward said rigid arm.

11. A construction as defined in claim 1 wherein said fastening means including an axle bolt rotatably supporting each said wheel, said vertically spaced means including a plurality of openings adapted to receive respective ones of said axle bolts when said arm means are removed.

12. A construction as defined in claim 8 wherein said recess means is formed by spaced lugs integral with said housing.

13. In a lawn mower of the type having a housing, ground engaging wheels supporting said housing relative to the ground and mowing blade means supported by said housing; that improvement in said mower which includes means adjustably interconnecting each said wheel with said housing for relative vertical movement therebetween, said interconnecting means comprising arm means detachably supported upon said housing adjacent each said wheel and adjustable relative to said housing, each said arm means including an interconnected rigid arm and flexible lever conjointly pivoted adjacent one end to said housing, each said flexible lever having a warped portion adjacent said pivoted area to take up slack between each said flexible lever and its associated rigid arm, fastening means associated with each said wheel for securing the latter to respective ones of said rigid arms, each said flexible lever having a free portion movable laterally relative to its respective arm, spaced lugs formed on the outer lateral side face of said housing adjacent each said arm means and defining recesses therebetween, each said flexible lever including a portion adapted to be received in said recesses to secure said arms in selected positions and said wheels in selected vertical positions relative to said houing, each said flexible lever being manually flexible laterally to withdraw said lever portions from between said lugs, said fastening means also being cooperable with vertically spaced means on said housing for adjustably securing said wheels directly to said housing when said arm means are omitted.

References Cited

UNITED STATES PATENTS

| | | | |
|---|---|---|---|
| 2,818.270 | 12/1957 | Cataline | 280—43.17 |
| 3,038,736 | 6/1962 | Root | 280—43.17 |
| 3,163,438 | 12/1964 | Bliss | 280—43 |

LEO FRIAGLIA, *Primary Examiner.*

JOEL E. SIEGEL, *Assistant Examiner.*